(12) United States Patent
Azzouz et al.

(10) Patent No.: US 9,203,610 B2
(45) Date of Patent: Dec. 1, 2015

(54) SYSTEMS AND METHODS FOR SECURE PEER-TO-PEER COMMUNICATIONS

(71) Applicants: Zyad Azzouz, Zurich (CH); Markus Kangas, Baden (CH)

(72) Inventors: Zyad Azzouz, Zurich (CH); Markus Kangas, Baden (CH)

(*) Notice: Subject to any disclaimer, the term of this patent is extended or adjusted under 35 U.S.C. 154(b) by 16 days.

(21) Appl. No.: 13/714,314

(22) Filed: Dec. 13, 2012

(65) Prior Publication Data

US 2013/0151853 A1    Jun. 13, 2013

Related U.S. Application Data

(60) Provisional application No. 61/570,251, filed on Dec. 13, 2011, provisional application No. 61/601,995, filed on Feb. 22, 2012.

(51) Int. Cl.
*H04L 9/08* (2006.01)
*H04L 29/06* (2006.01)

(52) U.S. Cl.
CPC ............... *H04L 9/08* (2013.01); *H04L 9/0838* (2013.01); *H04L 9/0863* (2013.01); *H04L 9/0869* (2013.01); *H04L 63/083* (2013.01); *H04L 63/0428* (2013.01)

(58) Field of Classification Search
CPC ..... H04L 9/08; H04L 63/0428; H04L 63/083; H04L 9/0863; H04L 9/0869; H04L 9/0838
USPC ........................................................... 713/171
See application file for complete search history.

(56) References Cited

U.S. PATENT DOCUMENTS

| | | | | |
|---|---|---|---|---|
| 5,241,599 A * | 8/1993 | Bellovin et al. | ............... | 713/171 |
| 5,872,917 A * | 2/1999 | Hellman | ........................... | 726/6 |
| 8,156,333 B2 * | 4/2012 | Schneider | ..................... | 713/168 |
| 2005/0097061 A1 * | 5/2005 | Shapiro et al. | .................. | 705/67 |
| 2008/0317228 A1 * | 12/2008 | Kay et al. | ................. | 379/201.01 |
| 2008/0320588 A1 * | 12/2008 | Lipetz | ............................. | 726/19 |
| 2011/0191862 A1 * | 8/2011 | Mandava et al. | ................ | 726/28 |

* cited by examiner

*Primary Examiner* — Saleh Najjar
*Assistant Examiner* — Oleg Korsak
(74) *Attorney, Agent, or Firm* — Procopio, Cory, Hargreaves & Savitch LLP; Noel C. Gillespie (57) ABSTRACT

Systems and methods for secure peer-to-peer communication are disclosed herein. Various embodiments of the present invention advantageously enable authentication of a remote device, but without the use of a PKI certificate, and more generally, without requiring involvement from outside parties. In an exemplary embodiment, a password-protected message may be sent to a remote device, the password-protected message containing a unique identifier of a local device and a locally generated random number. Upon accessing the password-protected message, the remote device may reply to the local device including its own unique identifier and a remotely generated random number, where the reply is encrypted using the locally generated random number. An acknowledgement message may then be sent to the remote device including a mutually unique key, where the acknowledgement message is encrypted using the remotely generated random number. Subsequent communications between these devices may then be encrypted with this mutually unique key.

27 Claims, 9 Drawing Sheets

SYSTEMS AND METHODS FOR SECURE PEER-TO-PEER COMMUNICATIONS

RELATED APPLICATIONS INFORMATION

This application claims the benefit of U.S. Provisional Patent Application Ser. No. 61/601,995, filed Feb. 22, 2012, as well as U.S. Provisional Patent Application Ser. No. 61/570,251, filed Dec. 13, 2011, the contents of both of which are incorporated herein by reference in their entireties as if set forth in full.

BACKGROUND

1. Technical Field

The embodiments described herein are related to secure communications, and more particularly, to systems and methods that allow devices to communicate securely on a peer-to-peer basis.

2. Related Art

When two devices are communicating and do not want a third party to listen in, they need to communicate in a way not susceptible to eavesdropping or interception. This is known as communicating in a secure manner or secure communication. Secure communication includes means by which people can share information with varying degrees of certainty that third parties cannot intercept what was said. Often some form of encryption is used to ensure secure communication between devices in a network.

In cryptography, encryption is the process of transforming information (referred to as plaintext) using an algorithm (called a cipher) to make it unreadable to anyone except those possessing special knowledge, usually referred to as a key. The result of the process is encrypted information (in cryptography, referred to as ciphertext). In many contexts, the word encryption also implicitly refers to the reverse process, decryption (e.g. "software for encryption" can typically also perform decryption), to make the encrypted information readable again (i.e. to make it unencrypted).

Encryption, by itself, can protect the confidentiality of messages, but other techniques are still needed to protect the integrity and authenticity of a message; for example, verification of a message authentication code or a digital signature.

Techniques in public-key cryptography have been used to accomplish both functions. Public-key cryptography utilizes asymmetric key algorithms, where the key used to encrypt a message is not the same as the key used to decrypt it. One of the two keys is published (i.e., "the public key"), while the other key is kept secret ("the private key"). The keys are related mathematically such that while it may be possible to derive the public key from the private key (e.g., by calculating its inverse), it is computationally infeasible to derive the private key from the public key. In many cases, these "one-way functions" (the most notable ones being the integer factorization and discrete logarithm problems) have no efficient solution, even when using a high-powered computer. Therefore, publishing the public key does not compromise the integrity of the overall system.

For a given public/private key pair, if the lock/encryption key is the one published then the system enables private communication from the public to the unlocking key's owner (i.e., only the user bearing the private key can unlock the encrypted contents of a message). If the unlock/decryption key is the one published, then the system serves as a signature verifier of documents locked by the owner of the private key (i.e., since only the user bearing the private key can lock/encrypt a message in this manner, and since only that user has access to the private key, this serves as strong evidence that the message is in fact authentic).

A significant problem for use of public-key cryptography is confidence that the public key is in fact authentic, i.e., that it actually belongs to the person or entity that it is purported to belong to, and further, that it has not been tampered with or replaced by a malicious third party. The usual approach to this problem is to use a public-key infrastructure (PKI), in which one or more third parties, known as certificate authorities, certify ownership of key pairs.

Figure 1:
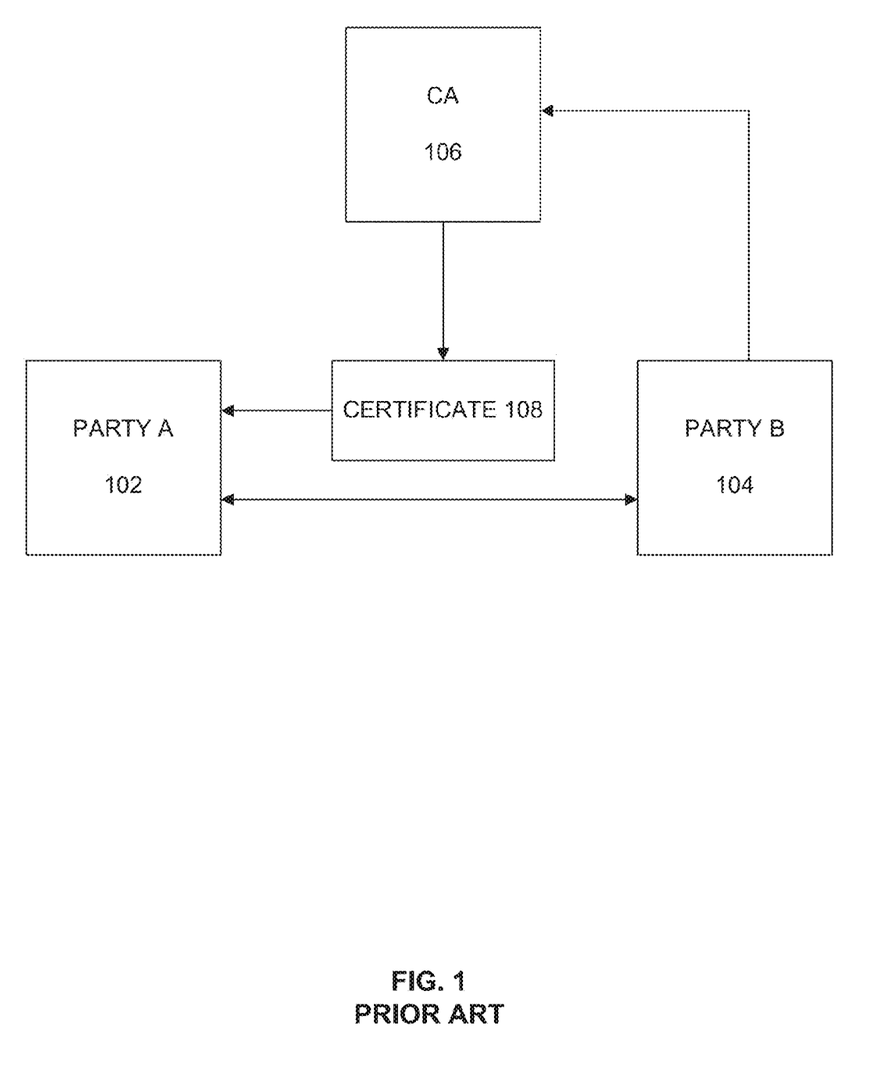
FIG. 1 is a block diagram illustrating an exemplary public-key infrastructure as known in the prior art.

FIG. 1 is a block diagram illustrating an exemplary public-key infrastructure as known in the prior art. Party A 102 wishes to communicate with Party B 104, and receives a public key purportedly from Party B 104. Party A 102 can now verify that this public key is in fact the public key associated with Party B 104 using certificate authority (CA) 106. If CA 106 issues a certificate 108, then Party A can assume the public key does in fact belong to that of Party B 104 and not to a malicious third party, for instance.

Use of such third party infrastructure, however, substantially raises the costs and overhead of secure communications and practically makes it inaccessible to the general public unless they are part of a corporation or other entity that uses encryption, or they make significant personal investment to gain access to secure communication software. Even in such cases, there is still no guarantee the target recipient has made a similar investment in using the same system as the sender.

What is needed are systems and methods for secure peer-to-peer communication capable of authenticating a remote device, yet without the use of a PKI certificate, and more generally, without requiring involvement from any outside parties. Ideally, such a system would enable a sender to attach time, place, and/or device restrictions on a message, as well as to recall messages already transmitted to a recipient.

SUMMARY

Various embodiments of the present invention are directed to systems and methods for secure peer-to-peer communication. Such systems and methods advantageously enable authentication of a remote device, but without the use of a PKI certificate, and more generally, without requiring involvement from any outside parties (e.g., certificate authorities, key signing parties, etc.).

In a first exemplary aspect, a method for establishing secure peer-to-peer communications is disclosed. In one embodiment, the method comprises: sending a password-protected message from the local device to a remote device, the password-protected message comprising a unique identifier of the local device and a locally generated random number; receiving an encrypted reply message from the remote device, the encrypted reply message comprising a unique identifier of the remote device and a remotely generated random number; decrypting the encrypted reply message based at least in part upon the locally generated random number; and sending an encrypted acknowledgement message from the local device to the remote device, wherein the encrypted acknowledgement message is encrypted based at least in part upon the remotely generated random number, and wherein the encrypted acknowledgement message comprises a mutually unique key generated by the local device.

In another embodiment, the method comprises: receiving a password-protected message at a local device, the password-protected message being sent from a remote device, the password-protected message comprising a unique identifier of the remote device and a remotely generated random number; using a received password to access at least part of the password-protected message; sending an encrypted reply message from the local device to the remote device, the encrypted reply message comprising a unique identifier of the local device and a locally generated random number, wherein the encrypted reply message is encrypted based at least in part upon the remotely generated random number; and receiving an encrypted acknowledgement message from the remote device, wherein the encrypted acknowledgement message comprises a mutually unique key generated by remote device.

These and other features, aspects, and embodiments are described below in the section entitled "Detailed Description."

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding of the invention and shall not be considered limiting of the breadth, scope, or applicability of the embodiments. It should be noted that for clarity and ease of illustration these drawings are not necessarily made to scale.

The various embodiments mentioned above are described in further detail with reference to the aforementioned figures and the following detailed description of exemplary embodiments.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of ordinary skill in the art to practice the invention. The following detailed description is therefore not to be taken in a limiting sense.

Various embodiments of the present invention are directed to a secure communication system that allows for secure peer-to-peer communications, while eliminating the need for a third party and its associated costs and infrastructure. Optionally, the sender of a message can also place time, location, and device/user restrictions on the message according to some embodiments, and/or recall one or more messages previously sent to a recipient.

Figure 2:
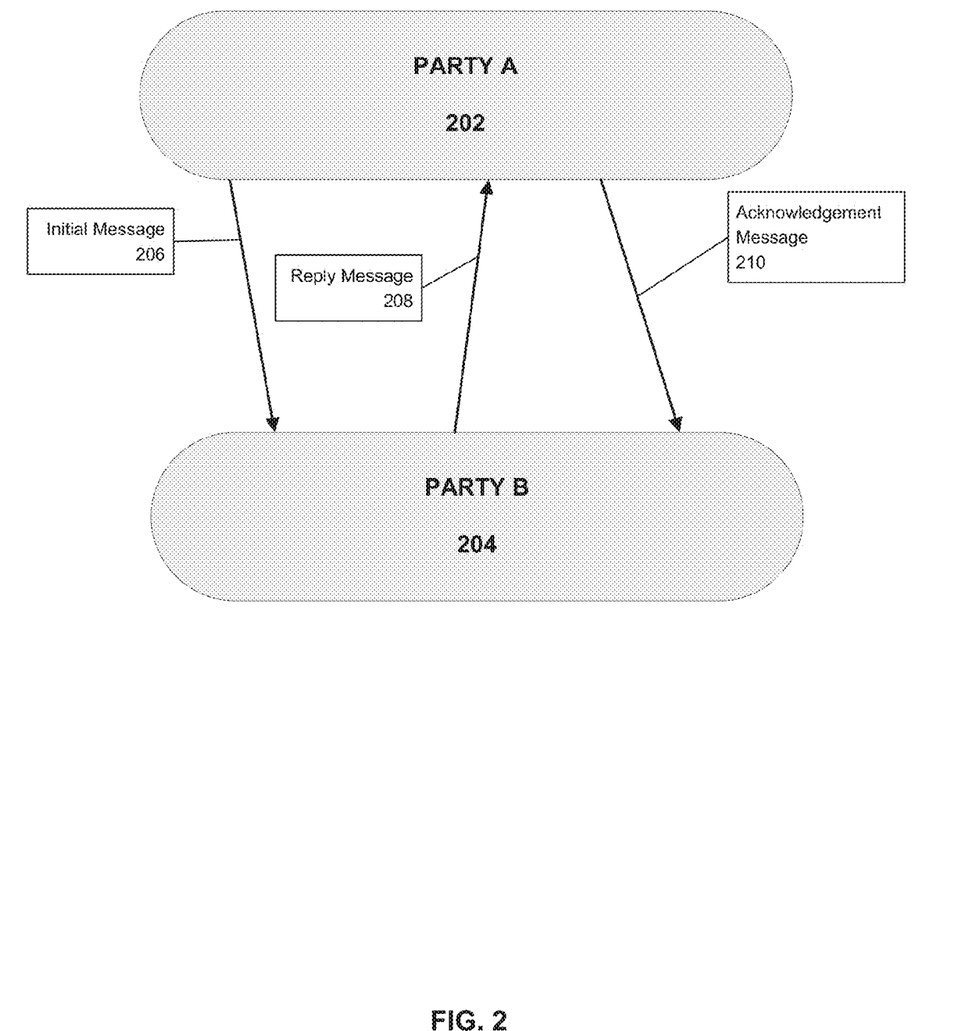
FIG. 2 is a block diagram illustrating an exemplary protocol for secure peer-to-peer communication between a first party and a second party according to one embodiment of the present invention.

FIG. 2 is a block diagram illustrating an exemplary protocol for secure peer-to-peer communication between a first party (Party A, 202) and a second party (Party B, 204) according to some embodiments of the present invention. Note that the exemplary protocol depicted in FIG. 2 is presented at a high-level in order to facilitate the reader's understanding of embodiments depicted in subsequent figures.

As illustrated by FIG. 2, the protocol generally consists of a three-step handshaking process. First, Party A 202 transmits an initial message 206 to Party B 204. Party B 204 reads the initial message 206 and responds by transmitting a reply message 208 to Party A 202. Party A 202 then reads the reply message and sends an acknowledgement message 210 back to Party B 204.

Party A and Party B can represent any type of electronic device, or set of electronic devices, that are connected over a network. This includes, without limitation, desktop computers, laptops/notebooks, terminals, personal data assistants, smartphones, tablets, digital audio recorders, digital audio players (e.g., mp3 players), video phones, video recorders, digital cameras, as well as various other types of portable electronic devices. Also, Party A and Party B do not necessarily need to be using the same type of electronic device according to embodiments of the present invention.

While many embodiments may utilize Internet protocols for a network connection between Party A 202 and Party B, it should be understood that any type of networking medium and/or networking protocol(s) may be employed (e.g., cellular networks, fiber-optic networks, cable networks, satellite networks, wireless networks, serial bus networks, etc.). Additionally, any type of network configuration or network topology may be used (e.g., personal area networks, metropolitan area networks, wide area networks, direct connection networks, star networks, ring networks, etc.).

Figure 3:
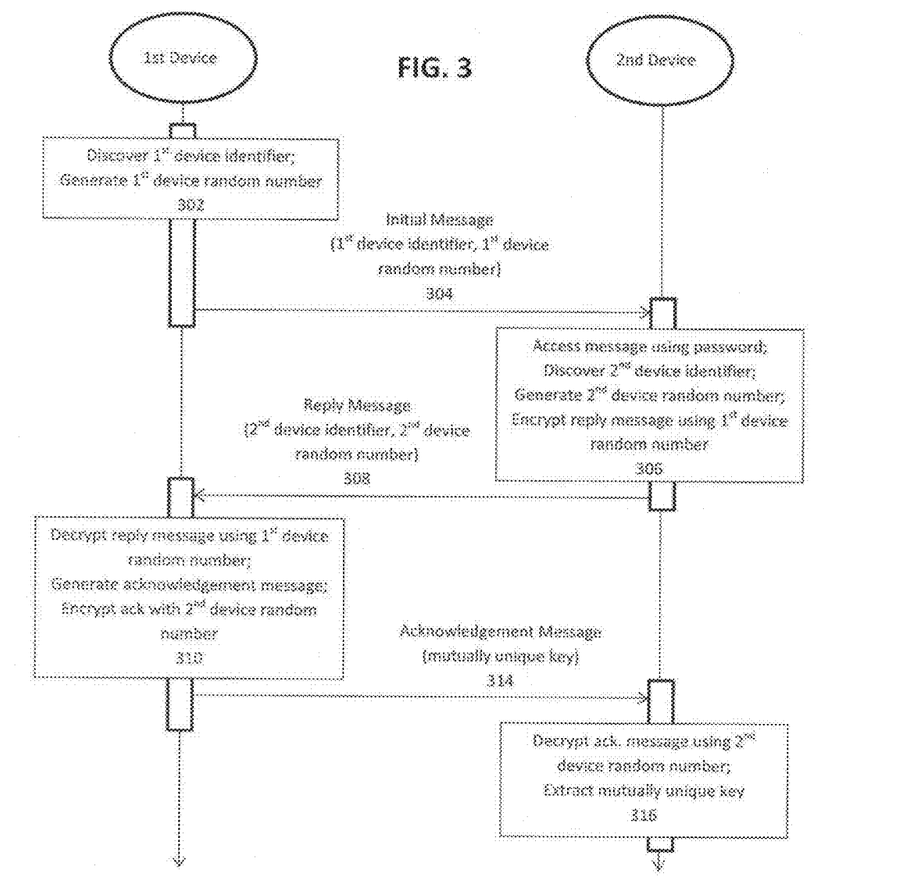
FIG. 3 is a sequence diagram illustrating an exemplary method for secure peer-to-peer communication between a first device and a second device according to one embodiment of the present invention.

FIG. 3 is a sequence diagram illustrating an exemplary method for secure peer-to-peer communication between a first device and a second device according to one embodiment of the present invention.

Before commencing this process, it is assumed that the first device (or a user of the first device) has securely transmitted a password to the second device (or to a user of the second device). This can be accomplished numerous ways. For example, the password can be transmitted between the users via a phone call, e-mail, by text, or in person. Alternatively, the first device may algorithmically generate a password and transmit this password to the second device. Note that the transmission of the password from the first device to the second device does not necessarily have to occur over the same network intended for subsequent peer-to-peer communication—a different network may in fact be used for this purpose.

At block 302, the first device discovers its own device identifier. As will be discussed in further detail below, according to some embodiments, an identification service associated with an application resident within memory of the first device may be responsible for generating the device identifier for the first device. A device identifier uniquely identifies a device among all other devices of the network.

The first device also generates a random number (or alternatively, a sequence of data at least a portion of which is randomly generated). As will be understood by those skilled in the art, the term "random" as used herein should be taken to include, without limitation, processes which simulate true randomness, i.e., pseudo-random number generation using random number seeds, as well as randomness simulated by hardware devices (e.g., linear feedback shift registers). The random number can serve in generating a key according to some embodiments. Alternatively, the random number can serve as an initialization vector.

At block 304, the first device may then transmit the initial message to the remote device, where the initial message is password-protected and contains both the device identifier of the first device as well as the random number generated by the first device. As will be discussed in further detail below, a container service associated with an application resident within memory of the first device may be responsible for aggregating the data into a single format.

Optionally, this initial message may also be encrypted using an application key, or form of public key known to the application running on the devices. In some embodiments, the application key can be partially (or entirely) based on the password. The first device may then wait for a reply message from the second device.

Note also that in some embodiments, until the first device receives a valid reply message from the second device (i.e., a reply message that is encrypted using the random number generated by the first device), all subsequent messages transmitted from the first device to the second device can remain password-protected in the manner described above.

The initial message is then received by the second device. Note that if the message was encrypted by the first device using the application key, the second device may first attempt to decrypt it. Such decryption may be contingent upon satisfaction of certain time, location, and device restrictions (as discussed in further detail below).

At block 306, using the previously received password, the contents of the message may then be accessed by the second device. The second device may discover its own device identifier using an identification service associated with an application resident within memory of the second device. The second device may also generate a random number (or alternatively, a sequence of data at least a portion of which is randomly generated) which can serve in generating a key according to some embodiments. Alternatively, this random number may serve as an initialization vector.

A container service associated with an application resident within memory of the second device may be responsible for aggregating this data into a single format for transmission to the first device, while an encryption service may be responsible for encrypting the reply message using the first device random number. The encrypted reply message may contain both the device identifier of the second device as well as the random number generated by the second device.

At block 308, the encrypted reply message may be sent to the first device. After transmitting the reply message, the second device may then wait to receive an acknowledgement message from the first device.

Note that in some embodiments, until the second device receives a valid acknowledgement message from the first device (i.e., a message that has been encrypted using the random number generated by the second device), all messages from the second device to the first device can be encrypted using the random number generated by the first device.

The first device then receives the encrypted reply message. At block 310, the first device attempts to decrypt the reply using previously transmitted random number, i.e., the random number the first device previously generated. Upon successful decryption, the first device may then access the contents of the reply message. As stated above, these contents include a device identifier of the second device as well as a random number generated by the second device.

The first device then generates a mutually unique key—i.e., a key that is unique for communication between a given pair of electronic devices. That is to say, the key that the first device uses to communicate with the second device will be a different key than the key that the first device uses to communicate with a third, fourth, or nth device.

In some embodiments, the mutually unique key can be based upon a combination of the first device and second device's randomly generated numbers and/or device identifiers. Thus, if both devices are running the same application, they may be able to derive the mutually unique key as soon as they receive the random number and/or device identifier associated with the other device. In some embodiments, the mutually unique key itself can be based upon a randomly generated number, for example, a number generated by the first device. If the first device and second devices are synchronized to the same clock, both devices may be able to generate the same mutually unique key according to some embodiments, i.e., obviating the need to transmit the mutually unique key over the network. In other embodiments (such as the embodiment depicted in FIG. 3), the mutually unique key may be transmitted from the first device to the second device as part of the acknowledgement message.

The acknowledgment message is then encrypted using the random number generated by the second device (i.e., the random number contained within the reply message), and the acknowledgement message is then transmitted to the second device at block 314.

Once the acknowledgement message has been received and decrypted by the second device (at block 316), and both devices have access to the mutually unique key, this key may then be used to encrypt/decrypt all subsequent communications between the first device and the second device and in the process authenticate the sender. In this manner, a method of secure peer-to-peer communication is established, yet without requiring involvement from outside parties (e.g., certificate authorities, key signing parties, etc.).

Thereafter, the first device can, for example, create a message, add at least one of a time, location, or device identifier restriction (as will be discussed below), encrypt the message and send the encrypted message over the transport layer. When the second device receives the message, the device can decrypt the message and then determine whether the message can be opened and displayed by checking the time, location, and identification restrictions. Only if all restrictions are satisfied will the content be unpacked and validly displayed.

In some embodiments, there can also be a device or application encryption layer. For example, the device or application can include another application generated encryption key or a password. Thus, even if the message is decrypted and all restrictions are satisfied, the content still cannot be accessed unless the user of the second device inputs the correct password into their device. If the correct password is provided, then the key can be generated and the content decrypted such that it can be displayed. This is commonly referred to as "two factor authentication," i.e., in order to get access to the message, the user must have the correct device and know the correct password.

In some embodiments, the sender can recall one or more of the messages ever sent to the recipient. For example, according to some embodiments, if the sender chooses to recall all messages ever sent to the recipient, the application resident on the sender's system may configure itself such that every message the sender subsequently transmits to that particular recipient will include within it a reset instruction, flag, or other such indicator. When the recipient attempts to open any message from the sender which includes such a reset instruction, the application resident on the recipient's device will process the reset instruction and thereafter disable the recipient's access to (or alternatively, delete) all messages that were ever sent by the sender to that recipient. According to these embodiments, the only way the recipient can avoid a recall is to refrain from opening any new messages transmitted from the sender. Note also that in many embodiments, the recipient has no way of knowing whether or not a received message includes such a reset instruction prior to opening the message.

Also, in some embodiments, messages may be automatically frozen after a predetermined period where no messages have been received. For example, if the second device has not received any more communications from the sender within a two day period (and this period may be user-definable according to some embodiments), access to the messages may be frozen. Alternatively, access may be frozen based upon the expiration of a period in which the user of the second device has not opened a message within the applicable period. In some embodiments, access to the messages may be unfrozen based upon a detected break in the period of inactivity (e.g., the receiving device finally receives another message, or the user of the second device finally opens a message sent from the first device, etc.).

In some embodiments, a dummy password or passwords can be set up to further protect the data. For example, the user can set up a dummy password and indicate that only certain content or messages should be displayed and accessible if this password is input into the device. If the user were then coerced into providing or inputting their password in order to open and display secure messages, the user can input or provide the dummy password and thereby still protect certain messages or content.

FIGS. 4-8 generally depict a set of services provided by an application resident within memory of each of the devices. The application may be provided on a CD, DVD, or other type of portable medium, or it may be downloaded from a remote server in the alternative.

In some embodiments, the set of services may include an identification service, a container service, an encryption service, a time service, and a location service. Each of these services will now be addressed in turn.

Figure 4:
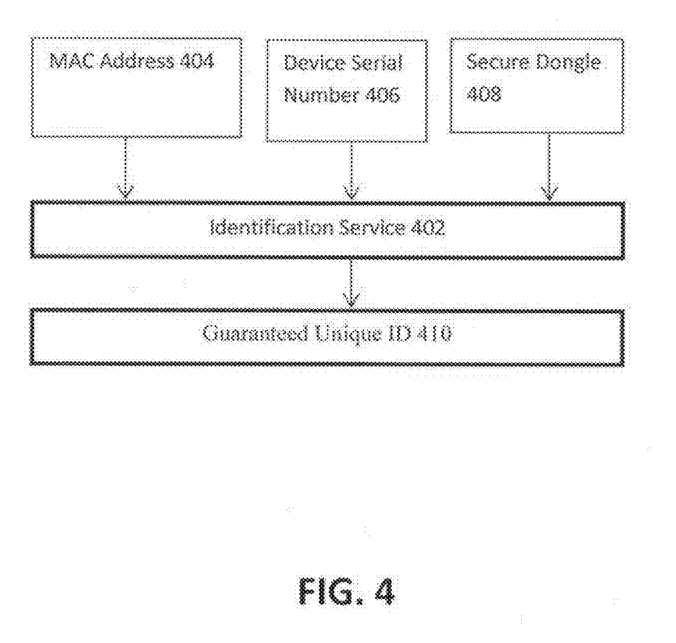
FIG. 4 is a block diagram of an exemplary identification service according to one embodiment of the present invention.

FIG. 4 is a block diagram of an exemplary identification service 402 according to one embodiment of the present invention. The identification service 402 can be internal or resident upon the device according to some embodiments. The identification service may be implemented as a program, method, or function that returns an identifier used for uniquely identifying a given device.

As depicted in FIG. 4, the identification service 402 may take a set of one or more inputs (for example, a MAC address 404, a device serial number 406, and optionally, other data) in order to generate the unique identifier. Optionally, a secure dongle 408 may also be utilized to enable access to the identification service 402.

The input data (e.g., MAC address 404 and/or device serial number 406) may be used to generate the identifier by any number of means (i.e., the data may be concatenated, modulated, reordered, or any combination thereof) to produce a unique identifier that would not be producible with a different combination of inputs. The identification service 402 therefore serves to ensure that any party (sender or receiver) involved in a communication is attributed an identifier that is guaranteed to be unique. This identifier is represented as guaranteed unique ID 410 in FIG. 4.

Figure 5:
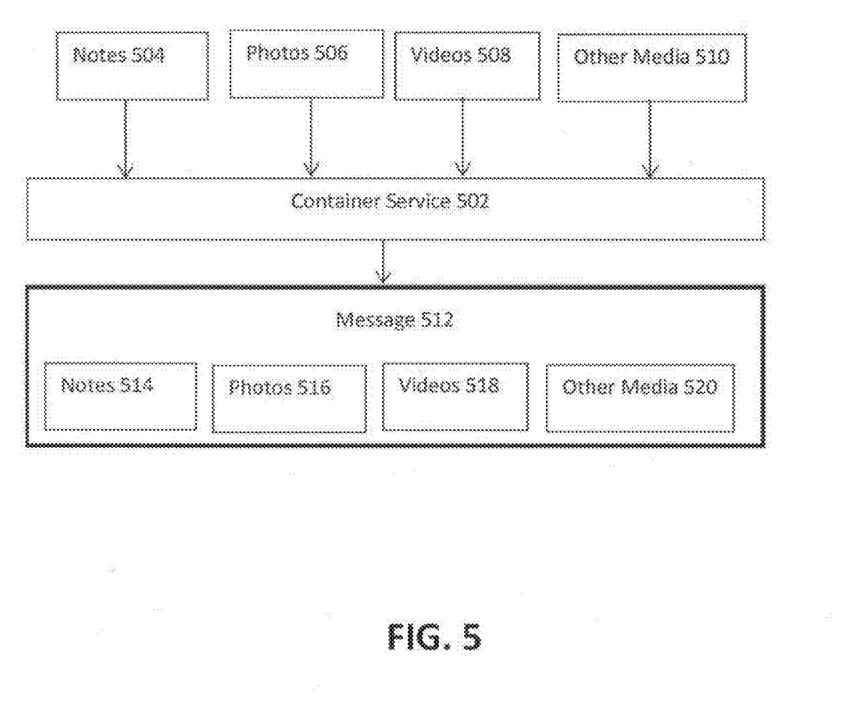
FIG. 5 is a block diagram of an exemplary container service according to one embodiment of the present invention.

FIG. 5 is a block diagram of an exemplary container service 502 according to one embodiment of the present invention. The container service may be used to aggregate different sets of data (i.e. data stored in different formats—e.g., notes 504, photos 506, videos 508, and other media 510) and thereafter encompass each of these data sets inside one or more messages 512. In some embodiments, each message 512 may include header information, an index to its content as well as an identifier of associated with message ordering, in addition to its payload information (not shown).

It should be noted that the specific data sets depicted in FIG. 5 are provided only for exemplary purposes. However, persons skilled in the art will appreciate that container service 502 is not limited to storing notes, photos, videos, but can store a wide variety of other types of binary data as well (e.g., pdf documents, location data, contact information, etc.).

Figure 6:
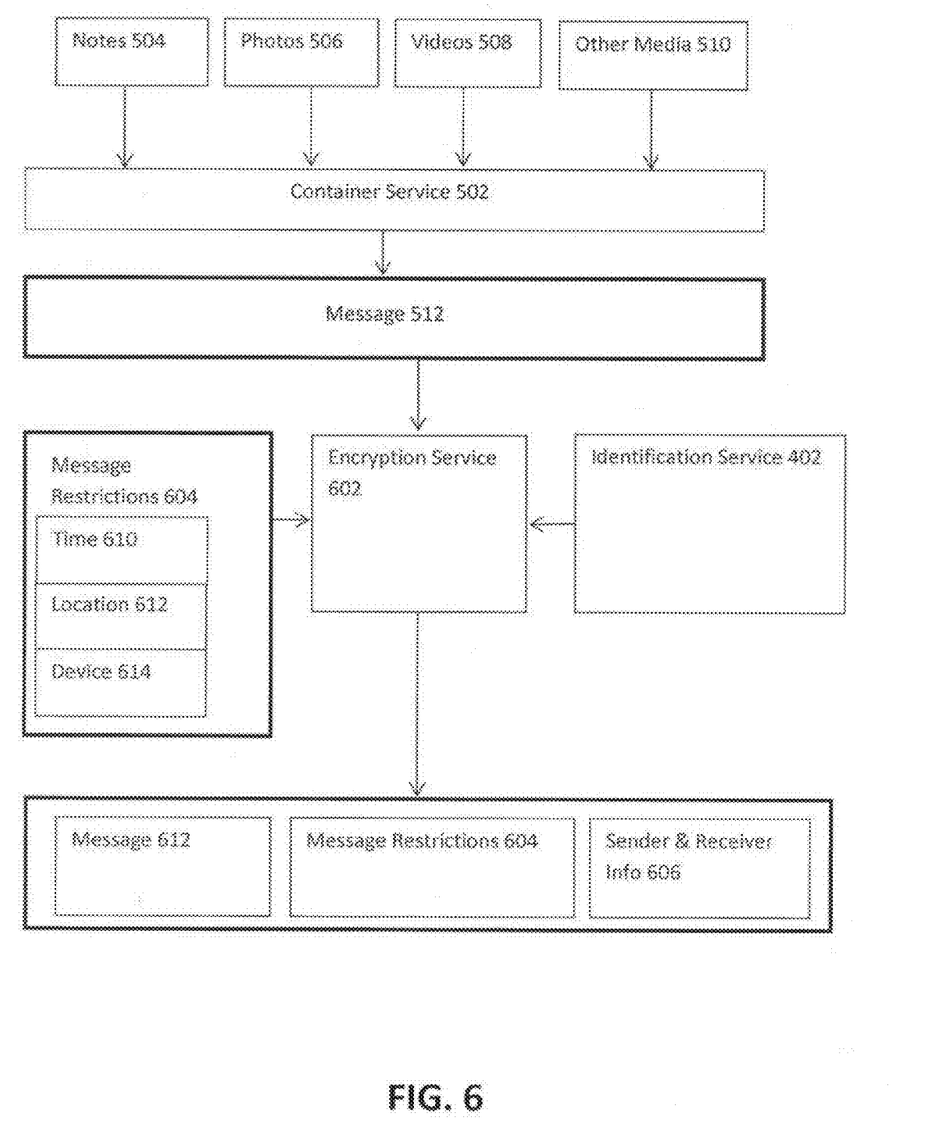
FIG. 6 is a block diagram of an exemplary encryption service according to one embodiment of the present invention.

FIG. 6 is a block diagram of an exemplary encryption service 602 according to one embodiment of the present invention. The encryption service 602 may be resident upon the device and serve to transform a message 512 into an encrypted message 612, for example, using industry standard encryption algorithms such as AES 256. In addition to the message content, the encrypted message may also contain one or more message restrictions 604 (e.g., time 610, location 612, and device 614 restrictions) for restricting access to the content of the message. Additionally, the encryption service 602 may include a set of sender and receiver information 606 as returned from the identification service 402.

In some embodiments, a user (e.g., the sender of a message) may provide time 610, location 612, and/or device 614 restrictions to be applied to the message to be sent.

As a first example, a user (e.g., the sender of a message) may provide absolute time limits (such as the message must be read by Nov. 3, 2013 3:00 p.m.), or alternatively, relative time limits (such as the message must be read within 24 hours of the time it has been sent, received, or first opened) into an interface associated with the application running on the first device. A time service associated with an application resident on the first device (discussed below with respect to FIG. 8) may be used for determining the time the message was transmitted; a time service associated with an application resident on a second device may be used for determining the time the message was received or opened. Thus, in some embodiments, the application running on the first device may be responsible for receiving the time restrictions from the sender and applying those restrictions to the message, while the application running on the second device may be responsible for enforcing those restrictions when the recipient attempts to access the message.

Location restrictions may operate similarly according to various embodiments of the present invention. As a second example, a user (e.g., the sender of a message) may provide a set of one or more locations where the message may be validly accessed. These locations may defined in a wide variety of ways, including, for example, local, regional, city, state, national, or any combination thereof. Alternatively, the user may specify a relative location (e.g., a radius) in which the message may be accessed (e.g., within 150 miles from the location the message was transmitted from). A location service associated with an application resident on the first device (discussed below with respect to FIG. 9) may be used for determining the location where the message was transmitted; a location service associated with an application resident on a second device may be used for determining the location where the message was received or opened (and note these locations may be different with respect to mobile devices). Thus, in some embodiments, the application running on the first device may be responsible for receiving the location restrictions from the sender and applying those restrictions to the message, while the application running on the second device may be responsible for enforcing those restrictions when the recipient attempts to access the message.

Device restrictions may also operate in a similar manner. A user (i.e., the sender of the message) may provide a set of one or more device identifiers into an interface associated with the application running on the first device. These identifiers may include, without limitation, a MAC address, a unique serial number of a certain device, a specific IP address or range of IP addresses (e.g., as defined by a network or subnetwork prefix), or the device identifier of a certain device as would be generated by the identification service. For cases where multiple users may use the same device, user identifiers may be used in the alternative or in addition to the device identifiers (e.g., a person's name, login ID, phone number, social security number, etc.). The identifiers may either serve to designate valid devices/users which are allowed to access the message, or devices/users which are not allowed to access the message in the alternative. As in the previous cases, the application running on the first device may be responsible for receiving the device restrictions from the sender and applying those restrictions to the message, while the application running on the second device may be responsible for enforcing those restrictions when the recipient attempts to access the message.

In certain embodiments, the application running on the sender's device can provide default settings for time 610, location 612, and/or device 614 restrictions so that the user does not need to set up restrictions for every message once they have been selected once. Alternatively, the user can be allowed to select time 610, location 612, and device 614 restrictions on a message by message basis.

Figure 7:
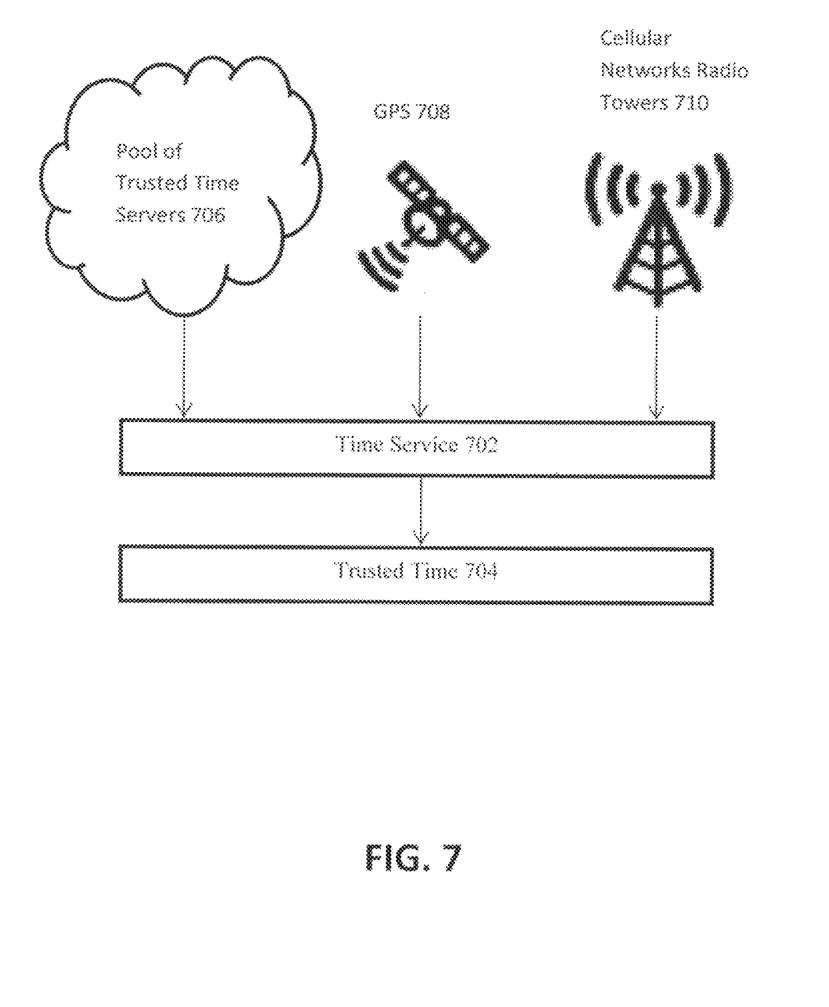
FIG. 7 is a block diagram of an exemplary time service according to one embodiment of the present invention.

FIG. 7 is a block diagram of an exemplary time service 702 according to one embodiment of the present invention. The time service 702 may be resident within the device itself, and/or it may utilize one or more outside sources in order to return a trusted time as well as check provided time restrictions. For example, computation of the trusted time may utilize pool of trusted time servers 706 (e.g., network time protocol), GPS infrastructure 708, and/or a cellular network radio towers 710 in order to determine the trusted time.

Figure 8:
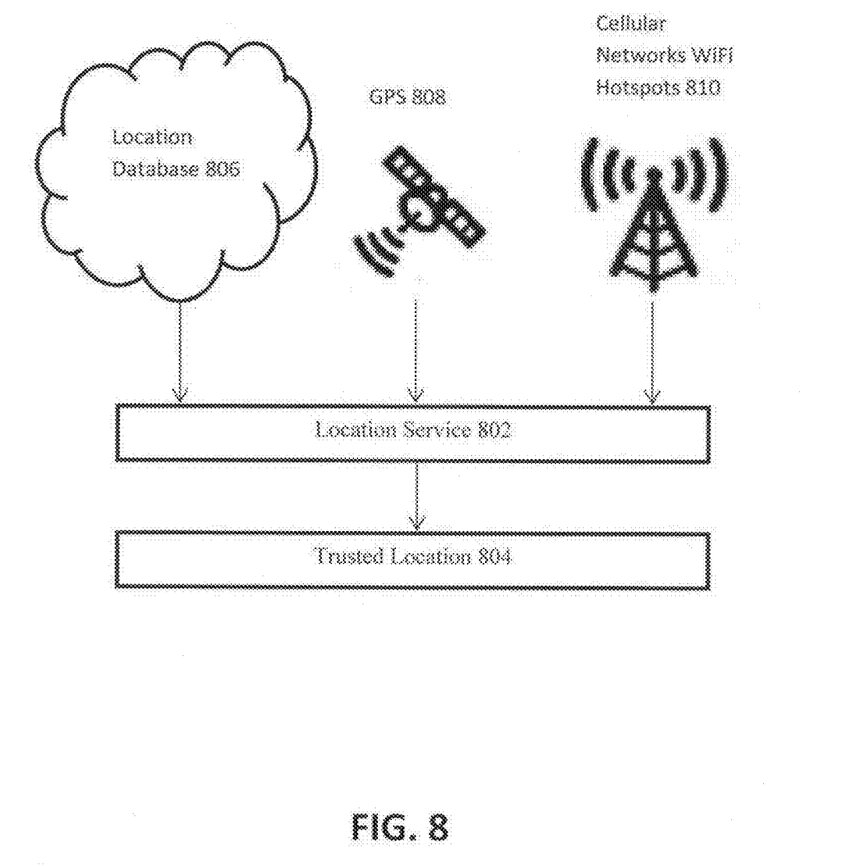
FIG. 8 is a block diagram of an exemplary location service according to one embodiment of the present invention.

FIG. 8 is a block diagram of an exemplary location service according to one embodiment of the present invention. The location service 802 may be resident within the device itself, and/or it may utilize one or more outside sources in order to return a trusted location as well as check provided location restrictions. For example, computation of the trusted location may utilize an online location database 806, GPS infrastructure 808, and/or cellular network data and WiFi hotspots 810 in order to determine the trusted location.

Figure 9:
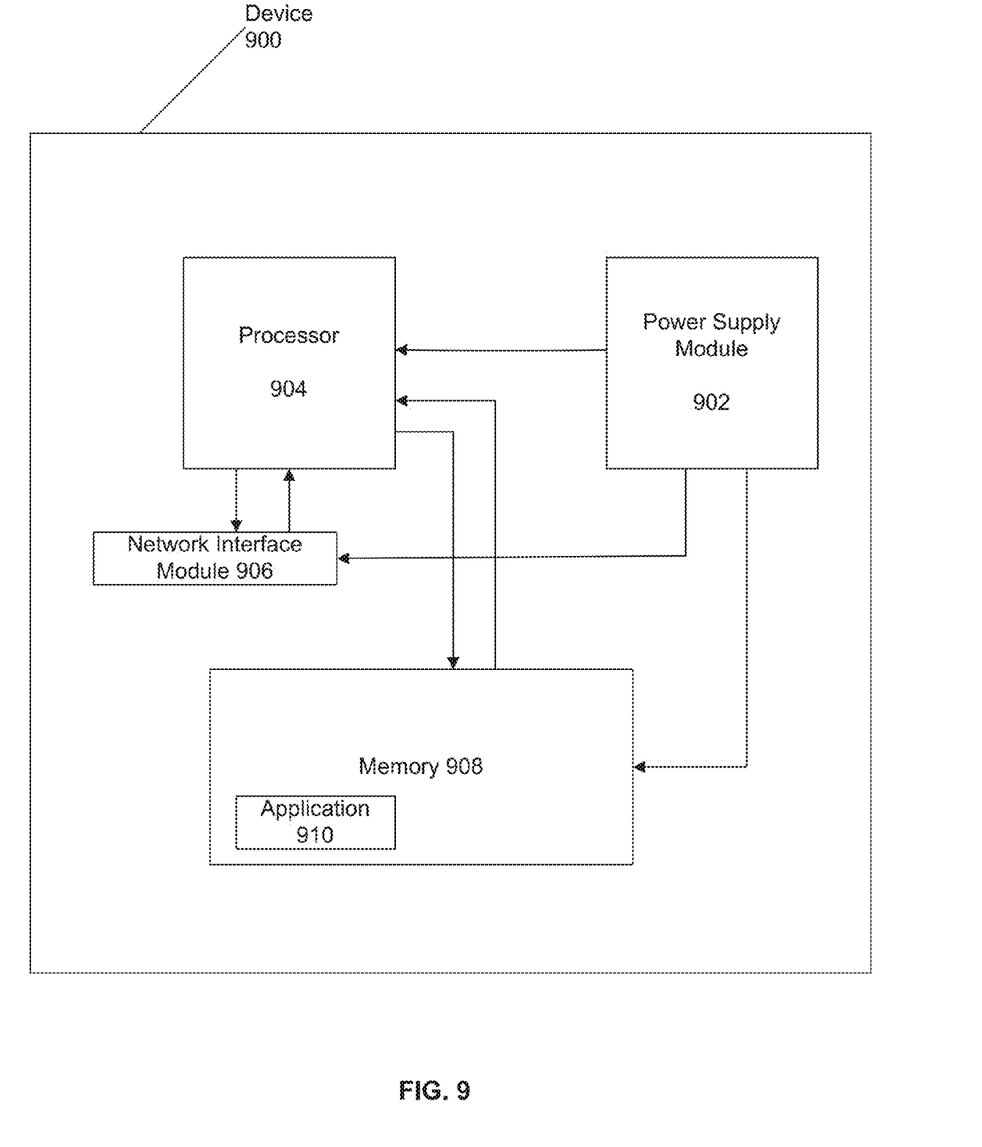
FIG. 9 is a block diagram of an exemplary device configured to run an application for establishing secure peer-to-peer communication between a first device and a second device according to one embodiment of the present invention.

FIG. 9 is a block diagram of an exemplary device 900 configured to run an application 910 for establishing secure peer-to-peer communication between a first device and a second device according to one embodiment of the present invention.

A power supply module 902 provides a source of power to the various electrical modules disposed within the device 900. In some embodiments, power is supplied externally by one or more conductive wires, for example, from a power cable or a serial bus cable. In other embodiments, a battery may be used as a source of power.

Memory 908 comprises any type of module adapted to enable digital information to be stored, retained, and retrieved. Additionally, memory 908 may comprise any combination of volatile and non-volatile storage devices, including without limitation RAM, DRAM, SRAM, ROM, and/or flash memory. Note also that the memory 908 may be organized in any number of architectural configurations utilizing, for example, registers, memory caches, data buffers, main memory, mass storage, and/or removable media.

Application 910, resident within memory 908, may contain one or more of the various services discussed above with respect to FIGS. 4-8. Note that while application 910 is depicted in FIG. 9 as software, persons skilled in the art will appreciate that application 910 may be implemented as any combination of software, firmware, or hardware.

One or more processors 904 are adapted to execute sequences of instructions by loading and storing data to the memory 908. Possible instructions include, without limitation, instructions for data conversions, formatting operations, communication instructions, and/or storage and retrieval operations. Additionally, the one or more processors 904 may comprise any type of digital processing devices including, for example, reduced instruction set computer processors, general-purpose processors, microprocessors, digital signal processors, gate arrays, programmable logic devices, array processors, and/or application-specific integrated circuits. Note also that the processors 904 may be contained on a single unitary integrated circuit die or distributed across multiple components.

Network interface module 906 provides a network interface for communications between device 900 and other network devices. As stated above, while many embodiments of the present invention may utilize the Internet for network communications between the first and second devices, it should be understood that any type of networking medium and/or networking protocol(s) may be used (e.g., cellular networks, fiber-optic networks, cable networks, satellite networks, wireless networks, serial bus networks, etc.). Additionally, any type of network configuration or network topology may be used in accordance with the scope of various embodiments (e.g., personal area networks, metropolitan area networks, wide area networks, direct connection networks, star networks, ring networks, etc.).

While various embodiments of the present invention have been described above, it should be understood that they have been presented by way of example only, and not of limitation. The breadth and scope of the present invention should not be limited by any of the above-described exemplary embodiments. Where this document refers to technologies that would be apparent or known to one of ordinary skill in the art, such technologies encompass those apparent or known to the skilled artisan now or at any time in the future. In addition, the invention is not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated examples. One of ordinary skill in the art would also understand how alternative functional, logical or physical partitioning and configurations could be utilized to implement the desired features of the present invention.

Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
sending a message that is protected using a password from a first device to a second device, wherein the password-protected message comprises a first unique identifier associated with the first device and a first random number generated by the first device;
receiving an encrypted reply message from the second device, wherein the encrypted reply message comprises a second unique identifier associated with the second device and a second random number generated by the second device;
decrypting the encrypted reply message based at least in part on the first random number;
generating a mutually exclusive key based at least in part on the first random number and the second random number;
sending a first encrypted message to the second device, wherein the first encrypted message is encrypted using the mutually unique key; and
receiving a second encrypted message from the second device, wherein the second encrypted message is encrypted by the second device using the mutually unique key.

2. The method of claim 1, further comprising transmitting the password to the second device.

3. The method of claim 1, wherein the first device and the second device are each adapted for running an application comprising:
an identification service configured to generate a unique device identifier for a target device;
a container service configured to store separate types of binary data in a container format; and
an encryption service configured to encrypt a target message.

4. The method of claim 3, wherein the application further comprises a time service configured to return a trusted time.

5. The method of claim 4, further comprising receiving an time restriction from a user of the second device, wherein the time restriction comprises a temporal limit for allowing the first device to access a corresponding message transmitted from the second device.

6. The method of claim 4, further comprising determining whether the first device may access a message received from the second device based at least in part on the trusted time and a time restriction associated with the received message.

7. The method of claim 3, wherein the application further comprises a location service adapted to return a trusted location.

8. The method of claim 7, further comprising determining whether the first device may access a message received from the second device based at least in part on the trusted location and a location restriction specified by a user of the second device with respect to the received message.

9. The method of claim 1, further comprising determining whether the first device may access a message received from the second device based at least in part on a device restriction specified by the a user of the second device with respect to the received message.

10. The method of claim 1, wherein the password-protected message is further encrypted using an application key.

11. The method of claim 10, wherein the application key is determined based at least in part up the password.

12. The method of claim 1, further comprising:
receiving a message from the second device that includes instructions to recall one or more messages previously received at the first device from the second device; and
in response to an attempt by the first device to access the message including the recall instructions, processing the recall instructions and disable access by the first device to the recalled one or more messages that was previously received at the first device.

13. The method of claim 1, further comprising disabling access to all messages received at the first device from the second device in response to a determination that no messages have been received from the second device for a predetermined period of time.

14. The method of claim 1, further comprising sending an encrypted acknowledgment message from the first device to the second device, wherein the encrypted acknowledgment message is encrypted using the second random number generated by the second device, and wherein the encrypted acknowledgment message comprises the mutually unique key.

15. The method of claim 1, wherein prior to sending the second encrypted message that is encrypted using the mutually unique key, the second device generates a same mutually unique key based on at least one of the first unique identifier, the second unique identifier, the first random number, and the second random number.

16. The method of claim 1, wherein the mutually unique key is further generated based on at least one of the first unique identifier and the second unique identifier.

17. A method comprising:
receiving, at a first device, a message that is protected using a password, wherein the password-protected message is sent by a second device, and wherein the password-protected message comprises a first unique identifier associated with the second device and a first random number generated by the second device;
using the password to access at least a portion of the password-protected message;
sending an encrypted reply message from the first device to the second device, wherein the encrypted reply message comprises a second unique identifier associated with the first device and a second random number generated by the first device, and wherein the encrypted reply message is encrypted using the first random number generated by the second device;
sending a first encrypted message from the first device to the second device, wherein the first encrypted message is encrypted using a mutually unique key, wherein the mutually unique key is generated based at least in part on the first random number and the second random number; and
receiving, at the first device, a second encrypted message from the second device, wherein the second encrypted message is encrypted by the second device using the mutually unique key.

18. The method of claim 17, further comprising determining whether the first device can access a message based at least in part on one or more values associated with the message.

19. The method of claim 17, wherein the password-protected message is further encrypted using an application key, and wherein the method further comprises decrypting the password-protected message based at least in part on application key.

20. The method of claim 19, wherein the application key is determined based at least in part on the password.

21. The method of claim 17, wherein accessing at least a portion of the password-protected message using the password includes comprises:
 determining whether the password matches a dummy password; and
 accessing noncritical content included in the password-protected message in response to a determination that the password matches the dummy password.

22. The method of claim 17, further comprising:
 receiving a message from the second device that includes instructions to recall one or more messages previously received at the first device from the second device; and
 in response to an attempt by the first device to access the message including the recall instructions, processing the recall instructions and disable access by the first device the one or more messages that was previously received at the first device.

23. The method of claim 17, further comprising disabling access to all messages received at the first device from the second device in response to a determination that no messages have been received from the second device for a predetermined period of time.

24. The method of claim 17, further comprising:
 using an application running at the first device to return a trusted time;
 determining whether the first device can access the password-protected message based at least in part on the trusted time and a time restriction specified by a user of the second device with respect to the password-protected message; and
 decrypting the password-protected message in response to a determination that the first device can access the password-protected message.

25. The method of claim 17, further comprising receiving an encrypted acknowledgment message from the second device, wherein the encrypted acknowledgment message is encrypted using the first random number generated by the second device, and wherein the encrypted acknowledgment message comprises a mutually unique key generated by the second device.

26. The method of claim 17, further comprising generating the mutually unique key at the first device based at least in part on the first random number and the second random number.

27. The method of claim 26, wherein the mutually unique key is further generated based on at least one of the first unique identifier and the second unique identifier.

\* \* \* \* \*